United States Patent [19]

Aske

[11] 4,128,010
[45] Dec. 5, 1978

[54] TEMPERATURE COMPENSATED PERMANENT MAGNET/MOVING COIL ACCELEROMETER

[75] Inventor: Vernon H. Aske, Hopkins, Minn.

[73] Assignee: Honeywell Inc., Minneapolis, Minn.

[21] Appl. No.: 835,272

[22] Filed: Sep. 21, 1977

[51] Int. Cl.² .................................................. G01P 15/08
[52] U.S. Cl. .................................... 73/497; 73/517 B; 335/217
[58] Field of Search .............. 73/497, 517 B; 318/634; 310/16; 335/217

[56] References Cited

U.S. PATENT DOCUMENTS

| 2,591,921 | 4/1952 | Cosgriff et al. | 73/516 R |
| 2,888,256 | 5/1959 | Sedgfield | 73/517 B |
| 3,152,485 | 10/1964 | Lones | 73/517 B |
| 3,613,454 | 10/1971 | McFadin | 73/362 AR |

Primary Examiner—James J. Gill
Attorney, Agent, or Firm—Charles L. Rubow; Henry L. Hanson

[57] ABSTRACT

A temperature compensated accelerometer of the type having a permanent magnet, moving coil rebalance system is disclosed. A cylindrical permanent magnet and surrounding sleeve produce radial magnetic fields in annular regions in which are located rebalance coils on a suspended bobbin. A noninductive temperature sensing winding on the magnet is connected in a bridge input circuit to an amplifier which produces a current in an auxiliary winding for augmenting the fields produced by the permanent magnet so as to maintain constant magnetic field strength in the annular regions.

10 Claims, 2 Drawing Figures

TEMPERATURE COMPENSATED PERMANENT MAGNET/MOVING COIL ACCELEROMETER

BACKGROUND OF THE INVENTION

The present invention relates generally to acceleration responsive devices, and more specifically to an accelerometer employing a permanent magnet/moving coil rebalance system and unique temperature compensation means for minimizing variations in accelerometer response due to changes in temperature.

Acceleration responsive devices perform essential sensing functions in a wide variety of systems. As performance requirements and available technology have advanced, the demand has increased for sensors characterized by much improved sensitivity, stability, accuracy, linearity of response, reliability and ruggedness, in addition to fast reaction time and low cost. Implicit in the stability, sensitivity and response linearity requirements is a requirement that precision be maintained over a wide temperature range. The present state of the art is such that it has been difficult to achieve improvements in all of the foregoing characteristics simultaneously, or, in some instances, even to achieve improvement in one characteristic without adversely affecting another. Nevertheless, requirements exist, particularly in aircraft navigation and missile guidance systems, for a single acceleration sensor with superior performance in all of the noted areas.

One of the functions which must be provided for in a nonintegrating accelerometer is that of returning the acceleration sensing mass to a predetermined rest position after it has been displaced by an acceleration. A variety of system variations for performing this rebalance function have been devised and are presently employed. One such system variation described as a permanent magnet/moving coil rebalance system has shown considerable promise in simultaneously meeting the performance and low cost requirements. However, an inherent characteristic of permanent magnet/moving coil systems is that any variation in magnetic flux density in the region surrounding the moving coil results in a variation in the magnitude of response resulting from a given input acceleration, or variation in scale factor. One source of variation in magnetic flux density stems from the temperature dependent permeabilities of known magnetic materials. Although the most stable magnetic materials have comparatively small temperature dependencies, no such material has been found which can meet the requirements for the most demanding accelerometer applications.

One known technique for improving accelerometer performance under varying temperature conditions is to provide a stable temperature environment for the accelerometer by means of a heater or other temperature control device. However, suitable forms of temperature control are complex, costly and result in slow accelerometer reaction time. Thus, the accelerometer designs requiring temperature control are not suitable for the most demanding aircraft navigation and missile guidance systems, and further do not meet the low cost objective dictated for many applications.

The applicant has avoided the above-described problems by providing a unique system for augmenting the magnetic field(s) produced in permanent magnet/moving coil accelerometer rebalance apparatus. The compensation system is simple, reliable and low in cost, and does not detract from the fast reaction time potential of permanent magnet/moving coil accelerometers. Accelerometers employing the applicant's temperature compensation system have been found capable of performance and reliability heretofore unavailable from simple low cost apparatus.

SUMMARY OF THE INVENTION

The invention herein set forth is an accelerometer including permanent magnet means for producing a magnetic field in which is located coil means forming at least a portion of a mass suspended for movement relative to the magnet means, a servo system for supplying current to the coil means to maintain the mass in a predetermined position relative to the magnet means and pickoff means for supplying a signal indicative of displacement of the mass from the predetermined position. Temperature compensation is provided by temperature sensing means for producing a temperature signal indicative of the temperature of said permanent magnet means, an auxillary winding associated with said permanent magnet means for augmenting the magnetic field produced thereby and amplifier means for supplying a temperature compensation current to the auxillary winding in response to the temperature signal.

The permanent magnet means may comprise a permanent magnet aligned with an input axis and a magnetically permeable sleeve cooperating with the permanent magnet to define first and second annular gaps containing substantially radial inwardly and outwardly directed magnetic fields respectively. The mass may comprise a tubular bobbin concentrically suspended between the permanent magnet and the sleeve, and carrying first and second circumferential coils wound in opposite directions, connected in series and centered in the first and second annular gaps respectively. The temperature sensing means and auxillary winding may comprise windings on the permanent magnet.

Accordingly, the primary object of this invention is to provide an accelerometer capable of superior performance.

A further object of this invention is to provide an accelerometer characterized by improved linearity of response and a constant scale factor.

A further object is to provide a unique temperature compensation system which does not detract from the superior performance characteristics of accelerometers employing permanent magnet/moving coil rebalance apparatus.

A further object is to provide a permanent magnet type of accelerometer in which the magnetic field is augmented so as to minimize the effects of temperature changes.

Yet a further object is to provide a temperature compensated linear accelerometer employing a permanent magnet/moving coil rebalance system.

Additional objects of the invention may be ascertained from a study of the disclosure, drawings and appended claims.

DESCRIPTION OF THE PREFERRED EMBODIMENT

Figure 1:
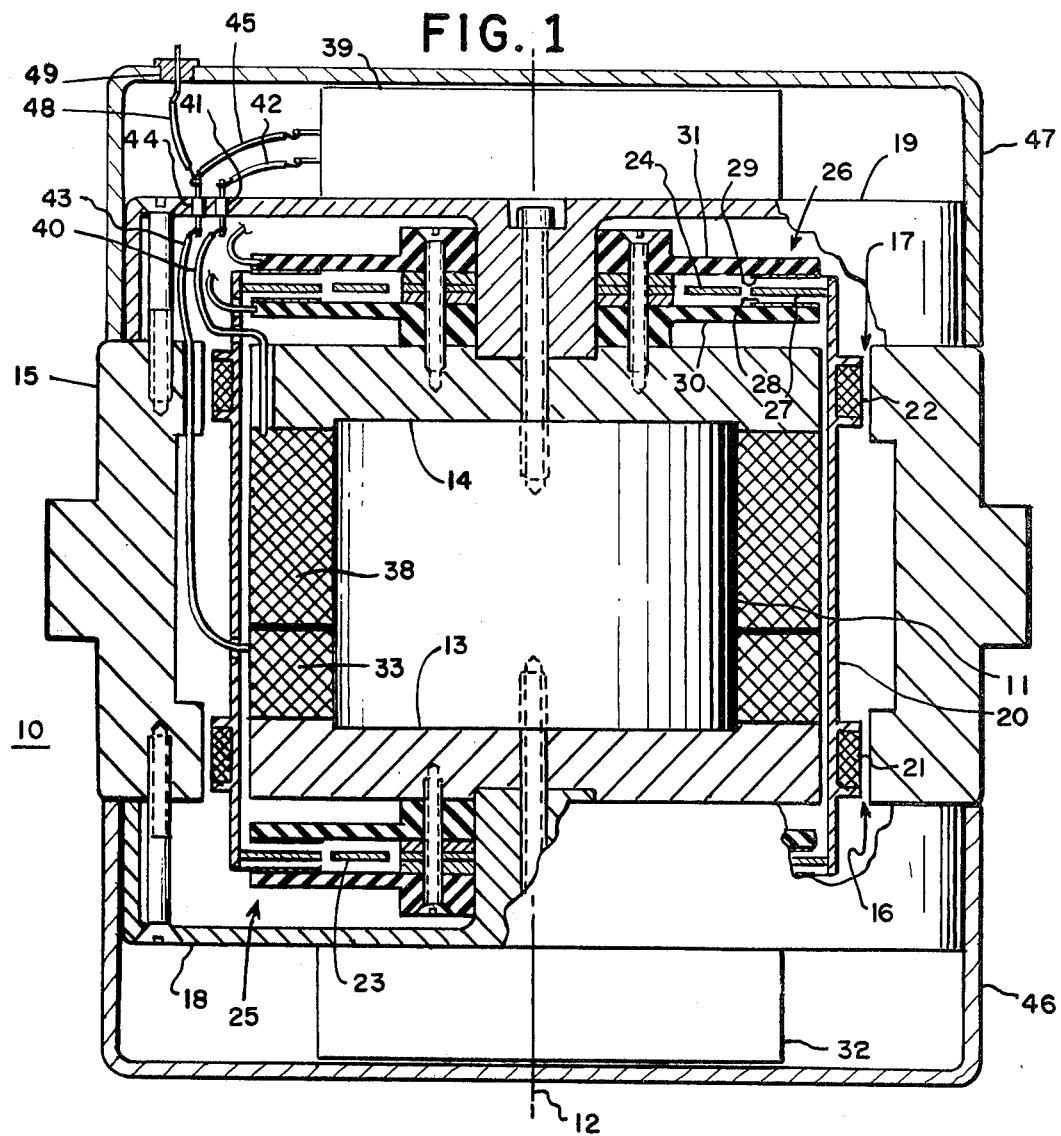
FIG. 1 is a view, partially in cross section, of a preferred embodiment of the applicant's permanent magnet/moving coil accelerometer employing a unique temperature compensation system.

In FIG. 1, reference numeral 10 generally identifies a linear accelerometer employing a permanent magnet/moving coil rebalance system. Accelerometer 10 includes permanent magnet means comprising a cylindrical permanent magnet 11 aligned with an input axis 12 and having opposite ends fitted with pole pieces 13 and 14, and surrounded by a concentric annular sleeve 15 of magnetically permeable material. Sleeve 15 is substantially coextensive with permanent magnet 11 and pole pieces 13 and 14 along input axis 12, and cooperates therewith to form a pair of separated annular regions 16 and 17 containing oppositely directed radial magnetic fields.

Sleeve 15 also serves as a center section of a housing including end caps 18 and 19 in which is suspended a tubular mass or bobbin 20 having an axis of circular symmetry which coincides with input axis 12. Bobbin 20 carries a pair of series connected, oppositely wound circumferential coils 21 and 22 centered on parallel planes having substantially the same separation as the annular regions of magnetic field.

Bobbin 20 is suspended for movement along input axis 12 by means of a pair of disk-shaped torsion hinge suspension assemblies 23 and 24, each basically configured as three concentric rings connected by torsion members lying along parallel axes perpendicular to input axis 12. Suspension assemblies 23 and 24 are of the type disclosed in detail in U.S. patent appln. Ser. No. 835,274 for a Linear Accelerometer with Torsion Hinge Suspension filed concurrently herewith in the name of the same applicant and assigned to the same assignee as the present application. Reference may be made to this copending application for a more complete understanding of the structure and operation of the suspension system and accelerometers of the type identified by reference numeral 10.

Accelerometer 10 includes position sensing or pickoff means for producing a signal indicative of displacement of bobbin 20 from a predetermined position relative to the accelerometer housing. The pickoff illustrated in FIG. 1 comprises two pairs of variable capacitors generally identified by reference numerals 25 and 26. Each capacitor is formed between a moveable plate comprising the outer ring of one of suspension assemblies 23 and 24 and an adjacent capacitor plate fixed relative to the accelerometer housing. For example, capacitor pair 26 is formed between outer ring 27 of suspension assembly 24 and fixed plates 28 and 29 carried on stationary insulating support disks 30 and 31.

The capacitors may be connected in a four active element bridge circuit for producing a position signal which is supplied to a servo amplifier in an electronic circuit package 32. The servo amplifier, in turn, supplies rebalance current to coils 21 and 22 so as to maintain bobbin 20 in the predetermined position relative to the accelerometer housing. This briefly described rebalance system including the permanent magnet means, moving coils, position pickoff and servo system is more fully described, both as to structure and operation, in U.S. patent appln. Ser. No. 835,273 for a Linear Accelerometer with Improved Magnetic Rebalance System filed concurrently herewith in the name of the same applicant and assigned to the same assignee as the present application.

As indicated in the foregoing discussion and in the previously identified patent application for an accelerometer rebalance system, constant accelerometer scale factor and sensitivity depend on a nonvarying magnetic field environment for the moving coils. The rebalance system disclosed in the application achieves significant improvement over prior art permanent magnet systems in providing such a nonvarying magnetic field. However, due to the temperature dependent magnetic permeability characteristics inherent in known magnetic materials, further temperature correction is necessary in accelerometers capable of meeting the most demanding performance requirements.

Figure 2:
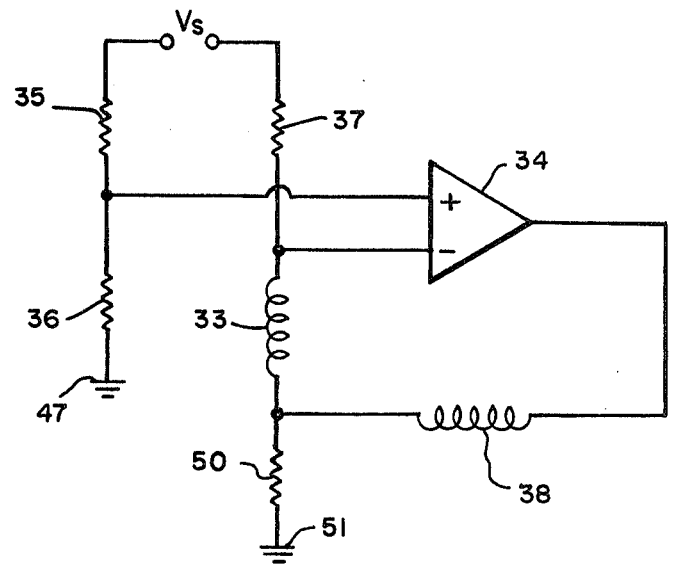
FIG. 2 is an electrical schematic diagram of the temperature compensation system for the accelerometer shown in FIG. 1.

As illustrated in FIG. 1, the applicant's temperature compensation system comprises a temperature sensing winding 33 noninductively wound around permanent magnet 11 between pole pieces 13 and 14. Winding 33 has a resistance which is inversely proportional to temperature, and may be formed of copper wire. As shown in FIG. 2, winding 33 forms a part of a resistance bridge circuit which supplies a signal to a differential amplifier 34. The bridge circuit and amplifier 34 are supplied with proper operating and bias voltages by means of voltage source $V_s$ and a network of resistors 35, 36 and 37 connected as shown.

Amplifier 34 supplies current of the appropriate magnitude and direction to an auxillary winding 38 wound around magnet 11 adjacent winding 33, but separated therefrom by a thin annular separator element. Current in winding 38 produces a magnetomotive force which either aids or opposes the magnetic flux produced by the permanent magnet means, depending on the direction of current in the winding. The separator element is formed of a nonmagnetic material, such as beryllium copper, and serves as an electrostatic shield between windings 33 and 38. It is pointed out that auxillary winding 38 may be arranged with equal effectiveness at various locations in the magnetic circuit. For example, given adequate space, the auxillary winding could be wound around the interior of sleeve 15.

Amplifier 34 and certain circuitry associated therewith are contained within an electronic circuit package 39 illustrated in FIG. 1. Temperature sensing winding 33 is shown electrically connected to a terminal of circuit package 39 through conductors shown for illustrative purposes as a conductor 40, an electrical feed through device 41 in end cap 19 and an electrical jumper 42. Similarly, auxillary winding 38 is shown connected to a terminal of circuit package 39 through a conductor 43, an electrical feed through device 44 and a jumper 45.

Covers 46 and 47 surround circuit packages 32 and 39 and end caps 18 and 19. The covers are formed of a magnetically permeable material so as to provide magnetic shielding, and may be joined to sleeve 15 by a hermetic seal. Certain electrical signals, such as the voltage across temperature sensing winding 33, are brought to the outside of the covers as illustrated by conductor 48 and electrical feed through device 49.

As shown in FIG. 2, auxillary winding 38 and temperature sensing winding 33 are connected to provide negative feedback around amplifier 34. A feedback resistor 50 is connected between the junction of windings 33 and 38 and ground 51. The value of resistor 50 is chosen so that the ratio of change in current through winding 38 to change in temperature matches the ratio of change in magnetic field produced by the permanent magnet means to change in temperature. It has been found that these parameters vary in a substantially linear manner, and that the temperature compensation circuit can provide for a substantially invariable magnetic field environment for the moving coils. Hence, this arrangement results in a substantially constant scale factor and sensitivity for accelerometer 10.

Although an embodiment of the applicant's permanent magnet/moving coil accelerometer employing temperature compensation has been shown and described for illustrative purposes, other embodiments which do not depart from the teachings therein will be apparent to those skilled in the art. It is not intended that coverage be limited to the disclosed embodiment, but only by the terms of the appended claims.

The embodiments of the invention in which an exclusive property or right is claimed are defined as follows:

1. A temperature compensated accelerometer comprising:
    a housing;
    permanent magnet means mounted in said housing for producing a magnetic field in a defined region;
    a mass having a coil thereon lying in a plane perpendicular to a central axis of the coil;
    a suspension system for mounting said mass so that said coil is positioned in the defined region with the axis of the coil transverse to the direction of magnetic field, said suspension system permitting movement of said mass relative to said housing;
    position sensing means for producing a position signal indicative of displacement of said mass from a predetermined position relative to said housing;
    servo amplifier means for producing a rebalance current in response to the position signal;
    electrical conductor means for supplying the rebalance current to said coil, whereby said mass is maintained in the predetermined position;
    a temperature sensing winding for producing a temperature signal indicative of the temperature of said permanent magnet means;
    an auxillary winding associated with said permanent magnet means for augmenting the magnetic field produced in the defined region;
    a differential amplifier having inverting and noninverting input terminals and an output terminal;
    means for connecting said auxillary and temperature sensing windings in series in a negative feedback circuit between the output and inverting input terminals of said differential amplifier; and
    biasing means for supplying biasing voltages to the inverting and noninverting input terminals of said differential amplifier.

2. The temperature compensated accelerometer of claim 1 wherein:
    said permanent magnet means is configured to produce a pair of oppositely directed radial magnetic fields in separated annular regions centered about an input axis;
    said mass comprises a bobbin carrying a pair of series connected oppositely wound circumferential coils centered on parallel planes having substantially the same separation as the annular regions of magnetic field; and
    said suspension system is configured to mount said bobbin in said housing so that said bobbin is centered about the input axis and the coils thereon are positioned in the annular regions of magnetic field, said suspension system permitting movement of said bobbin along the input axis.

3. The temperature compensated accelerometer of claim 2 wherein:
    said permanent magnet means comprises a permanent magnet aligned with the input axis and a magnetically permeable sleeve surrounding said permanent magnet, said sleeve being substantially coextensive therewith along the input axis, and cooperating therewith to form a pair of annular gaps which contain the annular regions of magnetic field; and
    said auxillary winding comprises a circumferential winding about the input axis between said permanent magnet and said magnetically permeable sleeve.

4. The temperature compensated accelerometer of claim 3 wherein said temperature sensing means comprises a winding on said permanent magnet.

5. The temperature compensated accelerometer of claim 4 wherein said temperature sensing winding is characterized by a resistance which varies substantially in proportion to the variation in permeability of said permanent magnet means with change in temperature.

6. The temperature compensated accelerometer of claim 1 wherein said negative feedback circuit includes a resistor connecting the junction between said auxillary and temperature sensing windings to a source of reference pontential, said resistor having a resistance which causes the current through said auxillary winding to vary inversely as the strength of the radial magnetic fields in response to changes in temperature.

7. In acceleration responsive apparatus of the type including permanent magnet means for producing a magnetic field in which is located a coil forming at least a portion of a mass suspended for movement relative to the magnet means, a servo system for supplying current to the coil to maintain the mass in a predetermined position relative to the magnet means and pickoff means for supplying a signal indicative of displacement of the mass from the predetermined position, temperature compensation means for minimizing nonlinearities in response resulting from changes in permeability of the magnet means with changes in temperature, comprising:
    a temperature sensing winding for producing a temperature signal indicative of the temperature of said permanent magnet means;
    an auxillary winding associated with said permanent magnet means for augmenting the magnetic field produced by said permanent magnet means;
    a differential amplifier having inverting and noninverting input terminals and an output terminal;
    means for connecting said auxillary and temperature sensing windings in series in a negative feedback circuit between the output and inverting input terminals of said differential amplifier; and
    biasing means for supplying biasing voltages to the inverting and noninverting input terminals of said differential amplifier.

8. The acceleration responsive apparatus of claim 7 wherein said temperature sensing means comprises a temperature sensing winding on said permanent magnet means, said temperature sensing winding being characterized by a resistance which varies substantially in proportion to the variation in permeability of said permanent magnet means with change in temperature.

9. The acceleration responsive apparatus of claim 7 wherein said negative feedback circuit includes a resistor connecting the junction between said auxillary and temperature sensing windings to a source of reference potential, said resistor having a resistance which causes the current through said auxillary winding to vary inversely as the permeability of said permanent magnet means in response to changes in temperature.

10. The acceleration responsive apparatus of claim 9 wherein:

said permanent magnet means comprises a permanent magnet aligned with an input axis and a magnetically permeable sleeve concentric with said permanent magnet and substantially coextensive therewith along the input axis, said permanent magnet and said sleeve cooperating to define first and second annular gaps containing substantially radial inwardly and outwardly directed magnetic fields respectively;

said mass comprises a tubular bobbin concentrically suspended between said permanent magnet and said sleeve for movement along the input axis, the tubular bobbin carrying first and second circumferential coils wound in opposite directions, connected in series and centered in the first and second annular gaps respectively; and said auxillary winding comprises a winding on said permanent magnet concentric with the input axis.

* * * * *